June 12, 1951 J. CIENFUEGOS, JR 2,556,522
IRRIGATING DEVICE FOR GROWING PLANTS
Filed June 6, 1947
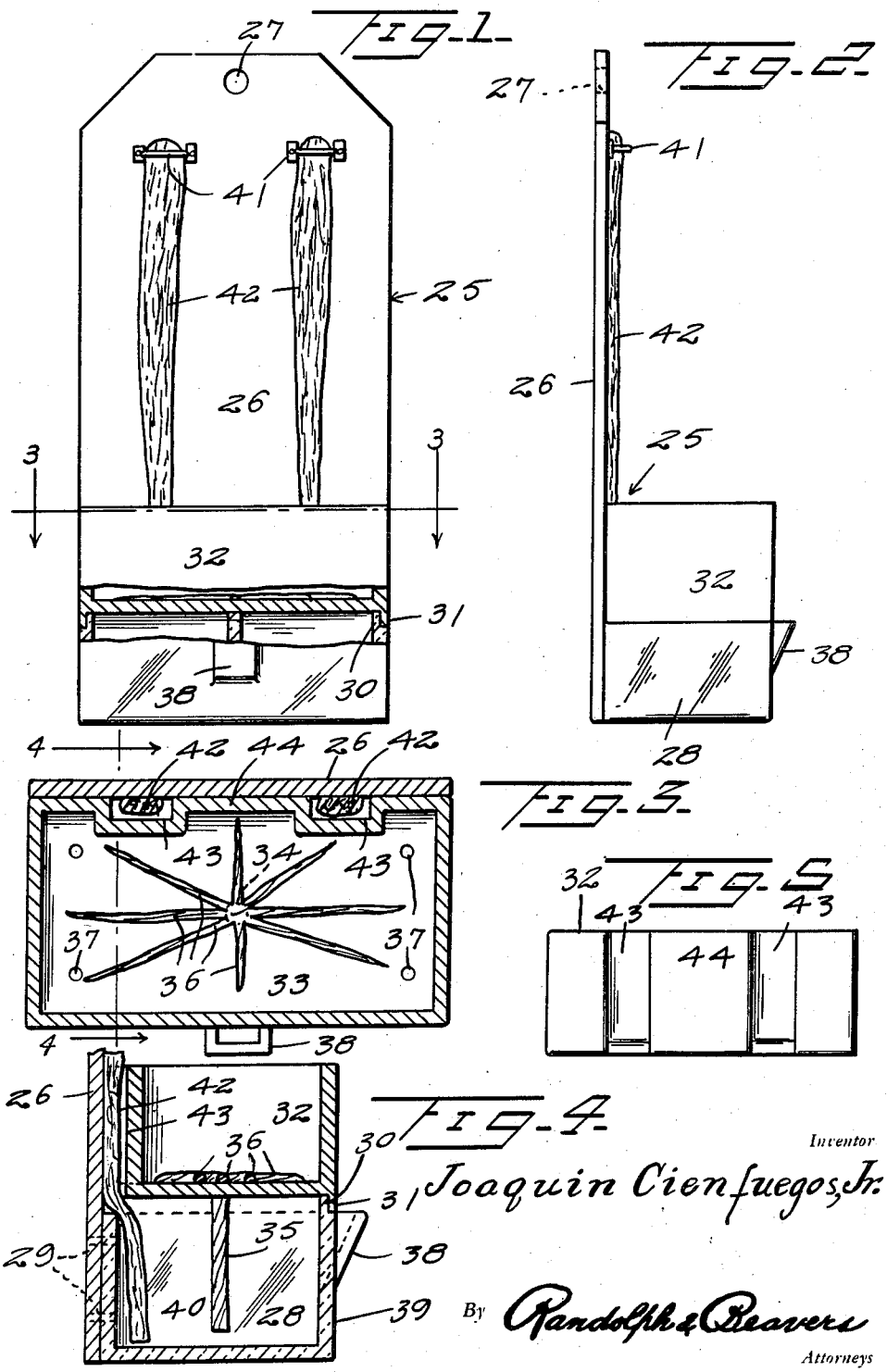
Inventor
Joaquin Cienfuegos, Jr.
By Randolph & Beavers
Attorneys Patented June 12, 1951

2,556,522

UNITED STATES PATENT OFFICE 2,556,522

IRRIGATING DEVICE FOR GROWING PLANTS

Joaquin Cienfuegos, Jr., Phoenix, Ariz.

Application June 6, 1947, Serial No. 753,104

2 Claims. (Cl. 47—38)

This invention relates to an improved construction of pot or indoor garden for use in growing plants and more particularly, has reference to a plant holder having irrigating means for supplying moisture to maintain proper growth of plants contained in the holder.

Another object of the invention is to provide a plant holder or pot including a reservoir capable of being readily refilled when the supply of water therein is exhausted or substantially exhausted and from which the water is supplied by capillary attraction to the plant holding portion of the device.

Still a further object of the invention is to provide a plant holder having drainage means to prevent the accumulation of an excess of water in the plant containing portion thereof and from which excess water is drained back into a reservoir.

Other objects and advantages of the invention will hereinafter become more fully apparent from the following description of the drawings, illustrating preferred embodiments thereof, and wherein:

Figure 1 is a front elevational view of the invention;

Figure 2 is an edge elevational view thereof;

Figure 3 is a horizontal sectional view taken substantially along a plane as indicated by the line 3—3 of Figure 1;

Figure 4 is a transverse vertical sectional view taken substantially along a plane as indicated by the line 4—4 of Figure 3, and Figure 5 is a rear elevational view of one section of the holder.

Referring more specifically to the drawing, the plant holder constituting the invention is constructed in the form of a hanging wall bracket, designated generally 25, comprising an elongated, relatively wide plate 26 having an opening 27, adjacent its upper end, for engaging a suitable hook or the like, not shown, by which the hanger plate 26 can be suspended against an upright supporting surface, not shown.

A suitable open top container 28 is secured to the plate 26 adjacent its lower end by fastenings 29, as seen in Figure 4, which engage one side wall of the container 28 for securing said side wall flush against the base plate 26. The container 28 is provided with an externally recessed rim or open top 30 for interfitting engagement with a depending flange 31 of a container 32 which is superimposed on the container 28 and detachably supported thereby on the wall bracket 25.

The bottom 33 of the open top container 32 is provided with a central opening 34 to accommodate one end of a wick 35 which extends downwardly therethrough to adjacent the bottom of the container 28 and which is preferably constructed of a plurality of twisted strands of spun glass. The wick 35 has individual strands 36, forming the opposite end thereof and which are disposed in the container 32 in outwardly diverging relationship relatively to one another, as best seen in Figure 3. The bottom 33 is also provided with a plurality of drainage openings 37 which discharge into the container 28 so that any excess moisture can drain back into the container 28 from the container 32 to prevent souring of the soil.

The container 28 is provided with an upwardly opening, upwardly and outwardly flared filling opening 38 in its front wall 39 by means of which the container 28, forming a reservoir, may be filled with water, as indicated by the broken line 40, without removing the plant holding receptacle 32 from its position on the reservoir 28.

The plate 26, adjacent its upper end, is provided with clamps 41 each of which is adapted to detachably clamp the upper end of an elongated mass of moss 42 to the forward side of the plate 26. The strands of moss 42 extend downwardly along the forward face of the plate 26 and through channels 43 formed in the rear wall 44 of the receptacle 32 and into the receptacle or reservoir 28, as seen in Figure 4.

The masses of moss 42 form poles for climbing plants, not shown, contained in the receptacle 32 and which are planted therein in potting soil or its equivalent, not shown, with which the receptacle 32 is filled or partially filled. The moss poles 42 are likewise moistened by the contents of the reservoir 28. Both the poles and wick 35 are maintained in a moist condition by capillary attraction thereby causing the moss to be maintained in a fresh condition for an indefinite period.

The plant holder 25 may be formed of a suitable plastic such as "Lucite" which may be of any suitable color and the reservoir 28 may be transparent so that the water level therein will be visible.

Various modifications and changes in the embodiment of the invention as disclosed are contemplated and may obviously be resorted to, without departing from the spirit or scope of the invention as hereinafter defined by the appended claims.

I claim as my invention:

1. A plant holder comprising an elongated relatively wide plate adapted to be suspended on an upright supporting surface and forming a supporting hanger, an open top receptacle secured to the forward face of said plate adjacent its lower end and supported thereby in substantially a horizontal position, said receptacle forming a reservoir adapted to contain water, an open top plant holding container superimposed on and detachably supported by the reservoir, interlocking means between the top of the reservoir and the bottom of the container, and an elongated mass of moss secured to said plate, lengthwise of its outer side and adapted to form a climbing pole for plants contained in the container, said container having an externally recessed rear wall forming a groove through which the moss extends into said reservoir.

2. A plant holder comprising an elongated relatively wide plate adapted to be suspended on an upright supporting surface and forming a supporting hanger, an open top receptacle secured to the forward face of said plate adjacent its lower end and supported thereby in substantially a horizontal position, said receptacle forming a reservoir adapted to contain water, an open top plant holding container superimposed on and detachably supported by the reservoir, interlocking means between the top of the reservoir and the bottom of the container, said receptacle having a rear wall secured to the plate and which terminates below the level of the container bottom, and the complementary rear wall of the container having external depressions forming channels extending from top to bottom thereof and combining with the upper edge of the receptacle to define moss receiving passages extending from above the plant container into the receptacle.

JOAQUIN CIENFUEGOS, Jr.

REFERENCES CITED

The following references are of record in the file of this patent:

UNITED STATES PATENTS

| Number | Name | Date |
| --- | --- | --- |
| 1,597,380 | Krgssik | Aug. 24, 1926 |
| 2,072,185 | Schein | Mar. 2, 1937 |
| 2,379,549 | Supplee | July 3, 1945 |

FOREIGN PATENTS

| Number | Country | Date |
| --- | --- | --- |
| 471,131 | Great Britain | Aug. 30, 1937 |
| 68,660 | Germany | Jan. 17, 1893 |